US005201377A

United States Patent [19]

Wilson

[11] Patent Number: 5,201,377

[45] Date of Patent: Apr. 13, 1993

[54] WHEELCHAIR WITH SIDEWARDLY SWINGABLE SEAT

[75] Inventor: Harold R. Wilson, Holland, Mich.

[73] Assignee: Love Lift, L.P., Holland, Mich.

[21] Appl. No.: 790,219

[22] Filed: Nov. 8, 1991

Related U.S. Application Data

[63] Continuation-in-part of Ser. No. 484,570, Feb. 23, 1990, Pat. No. 5,112,076, which is a continuation-in-part of Ser. No. 749,153, Aug. 23, 1991.

[51] Int. Cl.[5] .......... B62D 11/04

[52] U.S. Cl. .......... 180/6.5; 180/65.6; 180/907; 280/657; 280/765.1; 280/767; 297/DIG. 4; 414/921

[58] Field of Search .......... 280/250.1, 304.1, 639, 280/650, 657, 638, 43.17, 43.22, 43.23, 764.1, 765.1, 766.1, 767; 180/6.5, 65.1, 65.6, 907; 187/11; 297/345, 346, DIG. 4, DIG. 10; 414/660, 672, 921

[56] References Cited

U.S. PATENT DOCUMENTS

| | | | |
|---|---|---|---|
| 503,105 | 8/1893 | Tingley | 5/81 R X |
| 1,094,117 | 4/1914 | Butler | 5/86 |
| 2,339,007 | 1/1944 | Gahm | 5/81 R X |
| 2,498,853 | 2/1950 | Hassold et al. | 5/86 |
| 2,595,651 | 5/1952 | Feist | 5/86 |
| 2,681,455 | 6/1954 | Schwartz | 5/86 |
| 2,792,052 | 5/1957 | Johannesen | 5/83 X |
| 2,892,506 | 6/1959 | Slater | 5/81 R |
| 3,099,020 | 7/1963 | Garfield et al. | 5/81 R |
| 3,285,619 | 11/1966 | Kitrell et al. | 5/81 R |
| 3,394,933 | 7/1968 | Benoit | 5/81 R |
| 3,623,169 | 11/1971 | James | 5/81 R |
| 3,629,880 | 12/1971 | van Rhyn | 5/86 |
| 3,790,974 | 2/1974 | Johansson | 5/86 |
| 3,905,436 | 9/1975 | Karchak, Jr. et al. | 180/6.5 |
| 3,905,437 | 9/1975 | Kaiho et al. | 180/907 X |
| 3,917,076 | 11/1975 | Campbell | 5/86 X |
| 3,940,808 | 3/1976 | Petrini | 5/86 |
| 3,996,632 | 12/1976 | Bakker nee Viel | 5/83 |
| 3,999,227 | 12/1976 | Ingemansson | 5/86 |
| 4,010,499 | 3/1977 | Davis et al. | 5/81 R |
| 4,157,593 | 6/1979 | Kristensson | 5/81 R |
| 4,193,147 | 3/1980 | Fischer | 5/81 R |
| 4,240,169 | 12/1980 | Roos | 5/60 |
| 4,255,823 | 3/1981 | Boyer et al. | 5/81 R |
| 4,278,387 | 7/1981 | Seguela et al. | 414/462 |
| 4,375,840 | 3/1983 | Campbell | 180/6.5 |
| 4,399,572 | 8/1983 | Johansson | 5/81 R |
| 4,477,117 | 10/1984 | Higgs | 297/45 |
| 4,527,829 | 7/1985 | Fanslau et al. | 297/17 |
| 4,569,094 | 2/1986 | Hart et al. | 5/81 R |

(List continued on next page.)

FOREIGN PATENT DOCUMENTS

| | | | |
|---|---|---|---|
| 0067069 | 12/1982 | European Pat. Off. | 280/304.1 |
| 0136763 | 4/1985 | European Pat. Off. | 297/DIG. 4 |
| 1316673 | 6/1987 | U.S.S.R. | 180/6.5 |
| 1421368 | 1/1976 | United Kingdom | 414/921 |
| 2017014 | 10/1979 | United Kingdom | 414/921 |
| 2135183 | 8/1984 | United Kingdom | 280/250.1 |
| 2141980 | 1/1985 | United Kingdom | 280/304.1 |
| 9006097 | 6/1990 | World Int. Prop. O. | 280/304.1 |

*Primary Examiner*—Charles A. Marmor
*Assistant Examiner*—Brian L. Johnson
*Attorney, Agent, or Firm*—Flynn, Thiel, Boutell & Tanis

[57] ABSTRACT

A wheelchair arrangement provided with a wheeled base assembly having an upright assembly thereon, the latter including a pair of vertically extendible post arrangements positioned on opposite sides of the wheelchair arrangement. The upright assembly includes a pair of top arm arrangements which are cantilevered rearwardly from the upper ends of the posts arrangements. A seat assembly is removably attached to and positioned between the arm arrangements to facilitate transferring of an occupant, along with the seat assembly, either to or from the wheelchair arrangement. The arm arrangements permit both linear movement of the seat assembly in the front-to-rear direction and horizontal pivoting movement of the seat assembly sidewardly relative to the base assembly so that the seat assembly is oriented transversely relative to the front-to-rear direction.

27 Claims, 5 Drawing Sheets

U.S. PATENT DOCUMENTS

| | | | |
|---|---|---|---|
| 4,592,562 | 6/1986 | Strautnieks et al. | 280/250.1 |
| 4,631,761 | 12/1986 | Lederman | 5/81 R |
| 4,669,943 | 6/1987 | Zamotin | 414/343 |
| 4,704,749 | 11/1987 | Aubert | 5/81 R |
| 4,719,655 | 1/1988 | Dean | 5/81 R |
| 4,737,997 | 4/1988 | Lamson | 280/304.1 |
| 4,856,123 | 8/1989 | Henderson et al. | 5/81 R |
| 4,862,997 | 9/1989 | Eberle | 187/11 |
| 4,890,853 | 1/1990 | Olson | 5/81 R X |
| 4,974,905 | 12/1990 | Davis | 297/DIG. 4 X |
| 5,112,076 | 5/1992 | Wilson | 280/657 |
| 5,113,959 | 5/1992 | Mastou et al. | 180/907 X |

FIG. 3
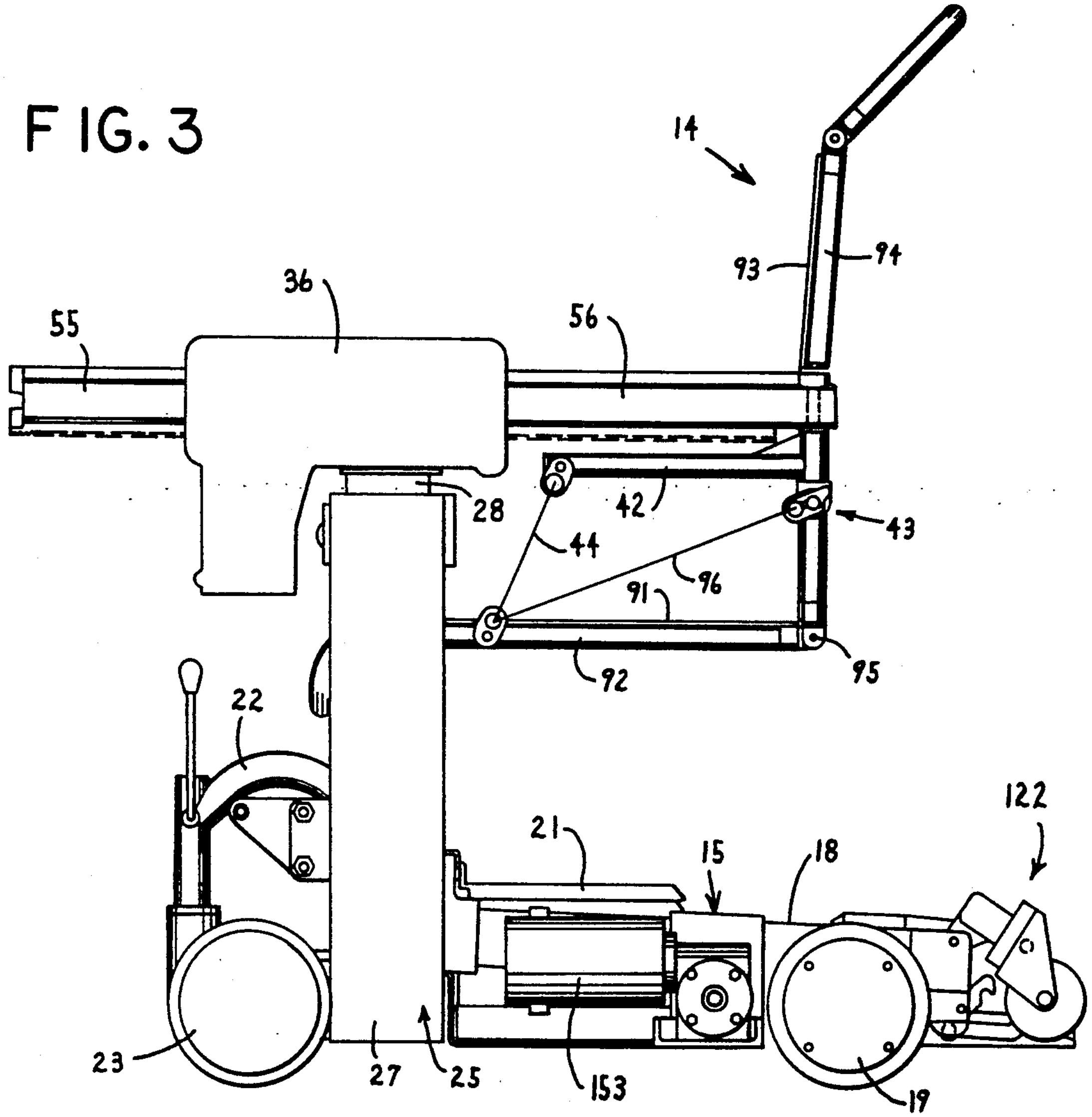
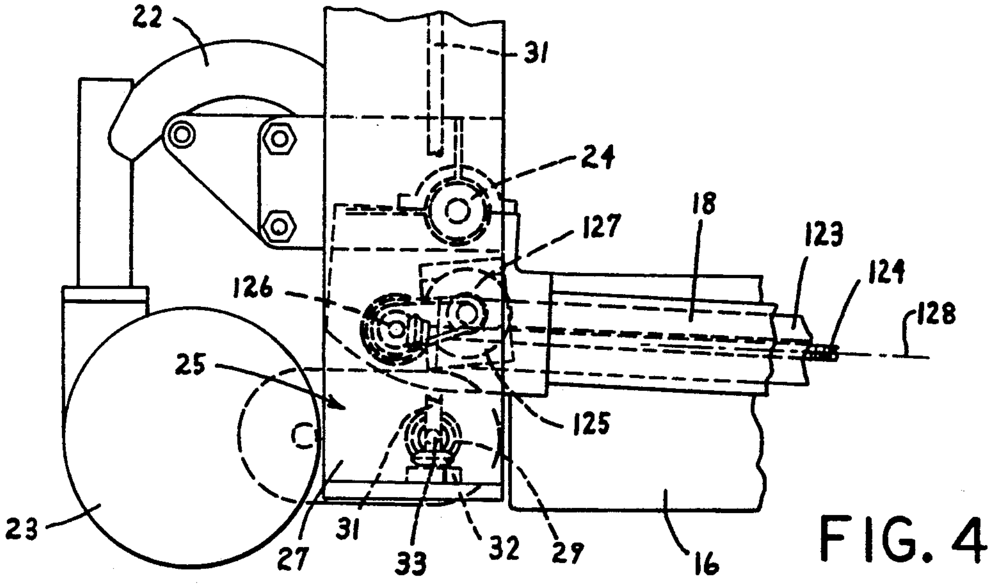
FIG. 4

FIG. 6
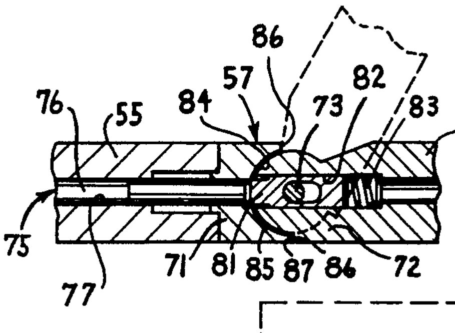
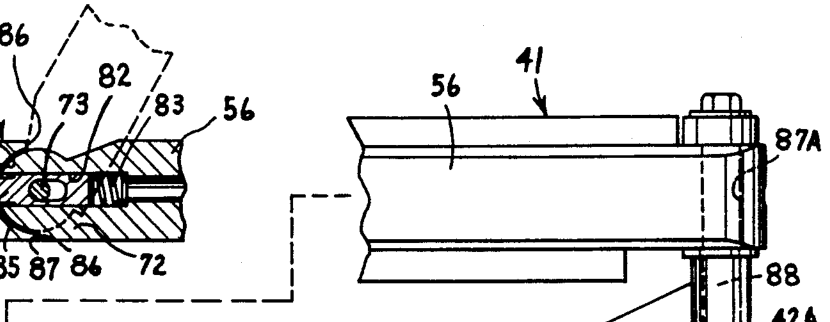
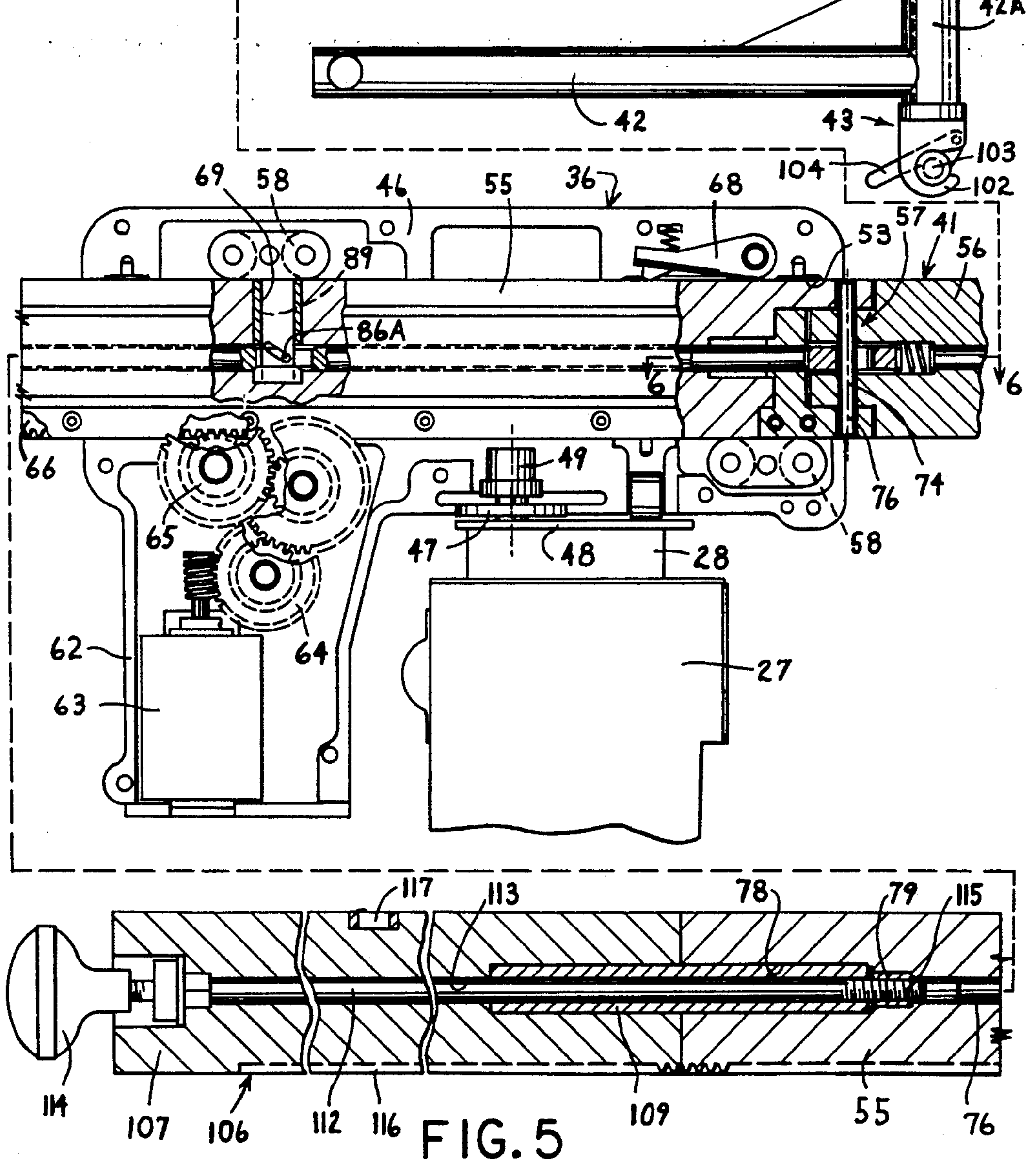
FIG. 5

WHEELCHAIR WITH SIDEWARDLY SWINGABLE SEAT

CROSS REFERENCE TO RELATED APPLICATIONS

This application is a continuation-in-part of application Ser. No. 07/484,570, filed Feb. 23, 1990, now U.S. Pat. No. 5,112,076 entitled "WHEELCHAIR WITH REMOVABLE SEAT", and copening Ser. No. 07/749 153, filed Aug. 23, 1991, and entitled "WHEELCHAIR SEAT CONVERTIBLE TO TOILET SEAT". The disclosures of the aforementioned applications are, in their entirety, incorporated herein by reference.

FIELD OF THE INVENTION

This invention relates to an improved patient support and transfer apparatus, and more specifically a wheelchair arrangement for use with an invalid or handicapped person, which apparatus provides significantly increased mobility and transferability of the person.

BACKGROUND OF THE INVENTION

Numerous wheelchairs have been developed for both residential and commercial use, including motorized wheelchairs. Some of these have provided limited vertical adjustability, and others have attempted to permit transfer of an occupant either onto or off of the wheelchair, such as by providing a removable seat. These prior structures, however, have proven to be less than desirable since most have not provided both a durable and simple structure while permitting vertical adjustability, nor have they provided a structure which can be conveniently manipulated to permit transfer of the occupant, such as when the seat is being transferred.

Further, particularly in medical facilities, transfer of patients is still accomplished primarily by using lift devices wherein a wheeled frame is provided with a vertically extendible upright post having a support arm projecting cantilevered from the upper end thereof, which arm has a slinglike seat suspended therefrom for supporting a patient. Such mechanisms do not function as wheelchairs, however, but solely as lifting and transfer devices. Further, such devices are frightening to the patient since the patient is supported solely by the suspended seat arrangement and does not have the comfort and security of being seated within a chair structure.

Accordingly, it is an object of the present invention to provide an improved wheelchair arrangement which can also function as a patient support and transfer apparatus, which arrangement is believed to represent a significant improvement over many of the wheelchairs and lifting devices which have been heretofore utilized.

More specifically, Applicant has developed an improved wheelchair which includes a pair of sidewardly-spaced vertically-extendible posts which support a pair of rearwardly-projecting cantilevered support arms adjacent the upper ends thereof, which arms in turn mount a detachable seat structure therebetween. This improved wheelchair, which is the subject of my aforementioned U.S. application Ser. No. 07/484,570 filed Feb. 23, 1990 now U.S. Pat. No. 5,112,076, has provided greatly increased capabilities which respect to the ability of the chair occupant to conveniently adjust the height of the seat depending upon the occupant's demands, together with the ability to maneuver the wheelchair in association with a bed or a vehicle to facilitate transfer of the seated occupant from or onto the wheelchair.

The present invention relates to further improvements in the wheelchair of the aforementioned application, which improvements provide even greater performance capabilities, particularly with respect to providing greater ability to transfer the seated occupant from the wheelchair onto a bed, a vehicle seat or the like, and vice versa, along with greater flexibility and capability of utilizing the wheelchair in conjunction with a standard toilet so as to not require transfer of the patient from the wheelchair when use of the toilet is desired.

The improved wheelchair arrangement of this invention can be utilized so as to function in a manner which corresponds to a conventional wheelchair, whereby an occupant can comfortably sit in and comfortably utilize the wheelchair, but which also provides greatly improved flexibility with respect to transporting and transferring of the occupant. This improved wheelchair is particularly desirable for use in medical facilities to improve the transportability and transferability of patients in a safe and secure manner while requiring minimal assistance from medical facility personnel, such as by permitting transfer of a patient while being assisted by only a single assistant. The wheelchair is also highly desirable for use in a residence or the like, particularly when provided with a driving motor so as to be self-propelled, to enable the occupant to control his/her own movements throughout the building, while at the same time enabling the occupant to have greatly improved flexibility with respect to functions which can be carried out, and also permitting the occupant to be readily transferred to or from the chair when assisted by another individual.

SUMMARY OF THE INVENTION

The improved wheelchair arrangement includes a wheeled base assembly provided with an upright assembly thereon, the latter including a pair of telescopic vertical post arrangements which are provided in the vicinity of the front corners of the wheelchair arrangement and are vertically extendible and contractible. The upright assembly includes a pair of top arm arrangements which are cantilevered rearwardly from the upper ends of the upright posts arrangements. A seat arrangement is removably attached to and positioned between the arm arrangements to facilitate transferring of an occupant, along with the seat arrangement, either to or from the wheelchair arrangement.

In the improved wheelchair, as aforesaid, at least one and preferably both of the top arm arrangements includes a generally horizontally elongated main support arm which includes elongate front and rear arm portions which are joined by a hinge arrangement which enables the rear arm portion to swing inwardly relative to the front arm portion, the latter being normally supported on the upper end of the respective vertical post arrangement. The main support arm has a releasable latch which normally locks the hinge to maintain the front and rear arm portions in a rigid aligned relationship, but which can be selectively released to enable inward swinging of the rear arm portion to facilitate horizontal pivoting of the seat assembly to facilitate patient transfer.

In the improved wheelchair arrangement, as aforesaid, each arm arrangement includes a support which is preferably horizontally pivotally supported on the top of the respective post arrangement, and which support in turn movably supports the main arm portion to permit substantially horizontal linear movement of the arm arrangement rearwardly to permit the seat arrangement to be moved rearwardly a limited extent. The support preferably mounts therein a drive arrangement which cooperates with the respective primary support arm to permit driven linear movement thereof. In addition, an elongate extension arm is provided which can be aligned with and fixedly attached to the front end of either one of the primary support arms, which extension arm when attached is rigid with the respective primary support arm and releases the latch associated with the hinge of the respective primary support arm to permit rearward movement of the respective primary support arm through a greater extent to hence facilitate rotating of the seat assembly horizontally through an angle of about 90°, whereby to facilitate transfer of the seat assembly and occupant either to or from the wheelchair arrangement.

In the improved wheelchair, as aforesaid, the wheeled base assembly includes a pair of sidewardly-spaced front casters, and a pair of sidewardly-spaced rear wheels, which wheels may be driven if desired to permit the wheelchair to be self-propelled. The base assembly also includes a stabilizing caster disposed adjacent each rear wheel which, in normal operation, is maintained close to the respective rear wheel. This stabilizing caster is supported on an extendible arm which enables the stabilizing casters to be extended a significant distance rearwardly from the rear wheels to increase the wheel base length of the wheelchair for stability purposes, particularly when the seat assembly is moved rearwardly. When extended rearwardly, the stability casters contact the floor so as to lift the rear wheels slightly out of engagement with the floor so that the wheelchair is supported primarily by the front casters and the rear stability casters. This not only provides increased stability and safety, but also enables the wheelchair arrangement to be moved sidewardly to facilitate patient transfer, such as when the wheelchair is backed over a bed or when cooperating with an automobile.

Other objects and improvements of the wheelchair arrangement according to the present invention will be apparent upon reading the following specification and inspecting the accompanying drawings.

BRIEF DESCRIPTION OF THE DRAWINGS

FIG. 3 is a side elevational view showing the wheelchair arrangement in the normal position of FIG. 1.

FIG. 4 is a fragmentary side elevational view, on an enlarged scale, illustrating the drive arrangements associated with the base and post assemblies.

FIG. 5 is a fragmentary side sectional view of the top arm arrangement with the auxiliary extender arm mounted thereon.

FIG. 6 is a fragmentary sectional view taken along line 6—6 in FIG. 5.

Figure 1:
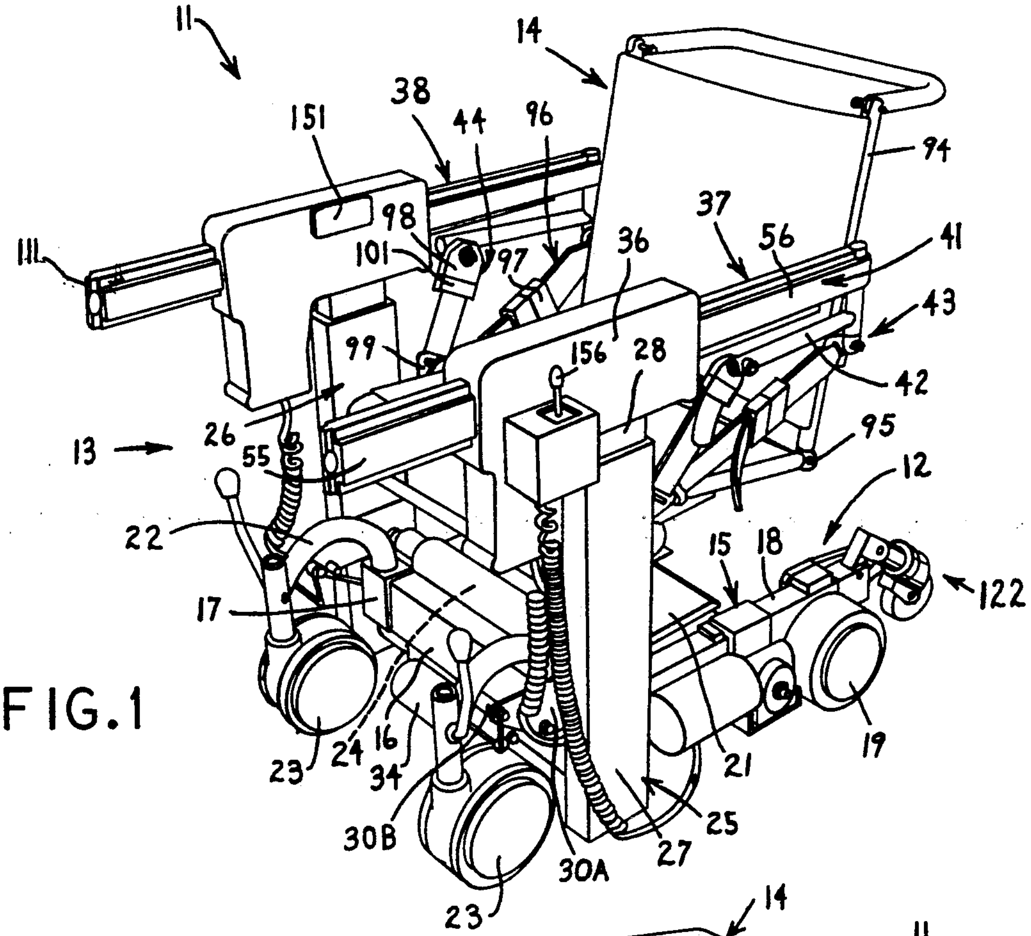
FIG. 1 is a perspective view which shows a wheelchair arrangement according to the invention in its normal position of use, in which position the post assemblies are in a lowered position and the seat assembly is in its forwardmost position.

Certain terminology will be used in the following description for convenience in reference only, and will not be limiting. For example, the words "upwardly", "downwardly", "rightwardly" and "leftwardly" will refer to directions in the drawings to which reference is made. These words will also be used to refer to directions sensed by a person seated in the wheelchair arrangement. The word "front" will refer to the side of the wheelchair arrangement through which the occupant may enter or exit the seat assembly, this being the left side in FIG. 1. The words "inwardly" and "outwardly" will refer to directions toward and away from, respectively, the geometric center of the wheelchair arrangement and designated parts thereof. Said terminology will include the words specifically mentioned, derivatives thereof, and words of similar import.

DETAILED DESCRIPTION

Referring to the drawings, there is illustrated a patient transporting and transferring device 11, specifically a wheelchair arrangement, according to the present invention. The wheelchair arrangement 11 includes a wheeled base assembly 12 having an upright assembly 13 mounted thereon and projecting upwardly therefrom. This upright assembly 13 in turn mounts thereon a removable seat assembly 14, the latter being used for receiving an occupant both for transporting by the wheelchair arrangement and transfer to and from the wheelchair arrangement.

The wheeled base assembly 12 includes a generally U-shaped base 15 which is disposed close to the floor and opens rearwardly. The base includes a control box 16 which extends horizontally and transversely across the wheelchair adjacent the front side thereof. This box 16 has opposite sides thereof fixedly mounted relative to brackets 17 which are rigidly secured to the forward ends of a pair of generally parallel and rearwardly projecting cantilevered side legs 18.

The base assembly 12 also includes a pair of front arms 22 which are secured to brackets 17 and project forwardly a small extent adjacent the front corners of the wheelchair arrangement and support thereon a pair of sidewardly spaced front support rollers 23, specifically casters which swivel about generally vertical axes. A further pair of rear support wheels 19 are disposed adjacent the rear corners of the base, one being disposed adjacent the free end of each side leg 18. The front and rear wheels are preferably of substantially the same diameter.

The box 16 extends sidewardly between and secured relative to the side legs 18. This box 16 is of low profile so as to not project upwardly a significant distance above the side legs, and has a removable top cover 21 to provide access to the interior thereof. The box 16 mounts therein a power source, specifically batteries for powering the various drive motors. This box also mounts therein appropriate electrical circuitry, normally circuit boards defining a microprocessor for controlling the wheelchair functions.

Considering now the upright assembly 13, it is defined primarily by a pair of vertically elongate and telescopic support posts assemblies 25 and 26 which are disposed on opposite sides of the wheelchair in the vicinity of the front corners thereof. The assemblies 25 and 26 are substantially identical (i.e., mirror images of one another).

The post assemblies 25 and 26 each include a vertically elongate lower support post 27 which has the lower end thereof secured to the base. This lower post 27 is of tubular construction and projects vertically upwardly a significant extent, and vertically slidably telescopically receives therein an upper support post 28. The lower post members 27, adjacent the lower ends thereof, are rigidly joined together by a cross tube 24 which is rotatably supported on the brackets 17. The lower post members each fixedly mounts thereon a securing plate 30A on which a removable stop pin 30B is provided, the latter contacting the arm 22 to stationarily secure the upright assembly to the base.

The upper and lower support posts 28 and 27, respectively, are each preferably of tubular construction so as to maximize the strength thereof, with posts have guide rollers cooperating therebetween in the same manner as disclosed in aforementioned application Ser. No. 07/484,570 (now U.S. Pat. No. 5,112,076, to facilitate the vertical displacement of the upper posts 28 during raising and lowering, and at the same time provide for maximum resistance to the load-imposed moments imposed on the lower post when the wheelchair arrangement has an occupant supported thereon.

The support post 27 and 28 preferably have rectangular cross sections with the front-to-rear cross-sectional dimension being substantially greater than the tubular cross-sectional dimension in the sideward direction.

To permit powered raising and lowering of the support post assemblies 25 and 26, each of the post assemblies includes an actuator which, in a preferred embodiment, includes a vertically elongate screw shaft 31 which projects vertically throughout the extent of the lower support post 27. This screw shaft 31 is rotatably supported in the post 27 and, adjacent its lower end, is drivingly coupled through a set of meshing bevel gears 32 to a drive shaft 33, the latter being rotatably supported within and extending along a cross tube 29 which rigidly joins together the lower ends of lower support posts 27. The threaded screw shaft 31 is threadably engaged within a ball nut which is fixed to and defines the lower end of the upper post 28 so that rotation of the screw shaft 31 in one direction or the other causes corresponding vertical displacement of the upper post 28 either upwardly or downwardly, respectively.

The drive shaft 33 is coupled to a drive motor 34 through a suitable speed reducing mechanism. This drive motor 34, which is mounted on the cross tube 29, is a conventional reversible direct-current motor, such as a gear motor which is coupled to and energized from the battery power source stored in the control box 16.

The upright assembly 13 also includes a pair of generally horizontally elongate support arm arrangements 37 and 38, which arrangements are substantially identical (i.e., being mirror images of one another). These arm assemblies 37 and 38 are disposed adjacent opposite sides of the wheelchair and normally extend in generally parallel relationship and in the front-to-back direction of the wheelchair. Each of the support arm arrangements 37 and 38 is supported on the upper end of the respective support post arrangement 25 and 26 by a support bracket or housing 36 as provided on the upper end of the respective post arrangement.

The arm arrangements 37 and 38 project generally horizontally rearwardly in a cantilevered fashion from the upper ends of the respective post assemblies, and each such arrangement includes a primary support arm 41 which has a front portion thereof engaged with the support housing 36 so that the rear portion of the support arm 41 projects rearwardly and is cantilevered. The rear free end of this primary support arm 41 in turn supports thereon the rearward end of a secondary support arm 42 which is disposed directly below and extends forwardly in generally parallel relationship to the primary support arm 41. This secondary support arm 42 terminates in a front free end which is located closely adjacent but disposed slightly rearwardly from the respective support post assemblies.

The seat assembly 14 is removably supported on and positioned generally between the support arm arrangements 37 and 38. For this purpose there is provided a first releasable connecting means 43 which coacts between the rearward free end of each support arm arrangement and the adjacent side of the seat assembly, and a second releasable connecting means 44 coacts between a front portion of the arm arrangement and the side frame of the seat assembly more closely adjacent the front thereof. These releasable connecting means 43 and 44 are described in greater detail hereinafter.

The support housing 36 includes a main housing portion 46 which includes a bottom mounting plate 47 which overlies a further mounting plate 48 which is fixed to the upper end of the top support post 28. These opposed mounting plates 47 and 48 have a hub structure cooperating therebetween which defines therethrough an opening for accommodating a fastener 49, such as a bolt which vertically secures the support bracket 36 to the top of the support post assembly but permits the support housing 36 to horizontally angularly move about a vertical pivot axis as defined by the bolt 49. The main housing 46 has a horizontally-elongated tunnel-like opening or passage 53 extending therethrough for accommodating a front portion of the primary support arm 41.

The primary support arm 41 includes horizontally elongate front and rear arm parts 55 and 56 respectively, adjacent ends of which are coupled together by a hinge means 57 which defines a vertical hinge axis. This hinge means 57, however, is normally maintained in a locked or non-hinging condition so as to maintain the front and rear arm parts in horizontally aligned relationship so as to effectively define a one piece rigid arm.

The front arm part 55 is, in the normal position of the wheelchair seat, disposed within the tunnel-like opening 53. In this normal position, the front arm part 55 projects outwardly a limited extent from the front end of the opening 53.

To provide both load-bearing and rolling support for the primary support arm 41, the housing portion 46 mounts thereon a plurality of load-bearing guide rollers 58 which rollingly support upper and lower surfaces of the primary support arm to permit horizontal linear movement thereof. This housing portion 46 also mounts thereon a plurality of side guide rollers (not shown) which rollingly support opposite sides of the arm.

The support housing 36 has a hollow front housing portion 62 which projects downwardly from the main housing portion 46 and is positioned directly adjacent the front side of the respective support post assembly. This front housing portion 62 mounts therein a suitable drive motor 63, such as a reversible direct current motor. This motor 63 drives a gear train 64 which terminates in a drive gear 65 which is disposed in meshing engagement with an elongate gear rack 66 defined on the lower side of the front arm part 55. This gear rack 66 extends from the front free end of the front arm part 55 but terminates short of the rearward end thereof.

The support housing 36 also mounts thereon a one-way latching dog or pawl 68 which is normally urged downwardly and is adapted for engagement within an opening 69 provided in the upper side of the front arm part 55. This opening 69 is disposed more closely adjacent the front end of this arm part.

Considering now the hinge means 57 associated with the primary support arm 41, this hinge means includes front and rear hinge parts 71 and 72 which are respectively fixed to the opposed ends of the front and rear arm parts 55 and 56. These hinge parts are joined by a vertical hinge pin 73 which defines a vertical hinge axis 74 which permits the rear arm part 56 to swing horizontally inwardly relative to the front arm part 55.

The front hinge part 71 has a concave arcuate surface 84 defined thereon, which surface is disposed directly adjacent and opposite a convex arcuate surface 85 defined on the rear hinge part 72. These surfaces 84 and 85 are both generated substantially about the vertical hinge axis 74. The front and rear hinge parts 71 and 72 also have opposed stops 86 and 87 thereon which limit the rear hinge part to a small angular displacement relative to the front hinge part. More specifically, these stops limit the arm parts 55 and 56 for movement between a first position wherein they are aligned, and a second position wherein the rear arm part is angularly displaced inwardly at an angle relative to the front arm part, which angle is normally in the range of 50 to 70 degrees from the straight aligned position.

To normally maintain the front and rear arm parts 55 and 56 in an aligned and rigid relationship, the main arm 41 mounts thereon a latching assembly 75 which normally maintains the hinge means 57 in a rigid and hence non-pivotal condition. This latching assembly 75 includes an elongate actuator rod 76 which is slidably supported in an elongate opening 77 which extends horizontally throughout the entire length of the front arm part 55. This opening 77, at its front end, is provided with a piloting portion 78 which is a cylindrical opening of enlarged diameter which opens inwardly from the front free end of the arm part. This front arm part 55 has an interiorly threaded sleeve 79 fixedly supported therein in coaxial alignment with the opening 77 directly adjacent the inner end of the pilot opening 78. The actuating rod 76 has the forward end thereof disposed so as to normally directly abut against a fixed stop which, in the illustrated embodiment, is defined by the inner end of the threaded sleeve 79. The actuating rod 76 projects rearwardly throughout the length of the arm part 55 so that the rearward free end of the rod 76 can be disposed substantially flush with the concave arcuate surface 84. The rearward free end of this actuator rod 76 is normally in abutting engagement with the forward end of a latch bolt or rod 81, the latter being axially slidably supported within an aligned opening 82 which extends longitudinally of the rear rod part 56 adjacent the forward end thereof. A biasing spring 83 coacts with the latch bolt 81 so as to urge the latter forwardly so that the front end thereof abuts the rear end of the actuator rod 76 and urges it forwardly for contact with the threaded sleeve 79, whereupon the latch bolt 81 projects partially into the opening 77 to thus prevent relative pivoting movement between the hinge parts 71 and 72.

The rearward free end of the primary support arm 41 is provided with an opening 87A extending vertically therethrough, in which opening is rotatably supported a vertically elongated support rod 88, the latter being axially captivated on the arm. This support rod 88 projects vertically downwardly a limited extent and rotatably supports thereon a sleeve 42A which is fixed to the rearward end of the secondary support arm 42, whereby arm 42 projects horizontally forwardly in a cantilevered fashion from this sleeve so as to normally be disposed substantially directly under the primary support arm 41.

Considering now the seat assembly 14, it includes a seat portion 91 defining thereon an upwardly facing surface on which an occupant can be seated, which seat portion 91 includes a pair of side frame elements 92 extending along opposite sides thereof. The seat assembly also includes a back portion 93 adapted for supporting the occupant's back, which back portion 93 also includes a pair of side frame elements 94. The back portion 93 traditionally projects upwardly at a significant angle relative to the seat portion 91 and, while such portions can be rigidly connected if desired, nevertheless the seat and back portions are preferably joined by a hinge 95 to permit the angularity of the back portion to be adjusted and to also permit the back portion to fold down so as to be substantially aligned with the seat portion.

To normally maintain the back portion in an upright condition relative to the seat portion, the seat assembly is provided with a connecting structure 96 to prevent unintended hinging of the back portion 93. This connecting structure 96 may assume many different configurations but, in the illustrated embodiment, includes an elongate flexible strap arrangement which preferably connects the seat and back portions adjacent opposite sides of the seat assembly, which strap arrangement on each side preferably has one end thereof anchored to the respective back side frame element 94 in upwardly spaced relationship from the hinge 95 and the other end thereof anchored to the seat side frame element 92 at a location spaced forwardly from the hinge 95. This strap arrangement preferably includes a releasable buckle arrangement 97, such as a conventional seat-belt buckle of the type used in automobiles, to permit the length of the strap arrangement to be adjusted while also enabling the strap arrangement to be totally disconnected. The structure of the seat assembly 14, and of the connecting structure 96 associated therewith, is disclosed in greater detail in my aforementioned application Ser. No. 07/484,570, now U.S. Pat. No. 5,112,076.

The seat portion 91 is also releasably interconnected to the support arm assemblies 37 and 38 by the releasable connecting means 44 which, in the illustrated embodiment, includes an elongate strap assembly having brackets or buckles 98 and 99 at opposite ends thereof.

The bracket 98 is hingedly connected to the front free end of the secondary support arm 42, and the other bracket 99 is hingedly joined to the respective side frame element 92 of the seat portion at a location which is disposed at least somewhat forwardly from, the front-to-back midpoint of the seat portion 91. This strap assembly is provided with a releasable buckle assembly 101, again corresponding to a conventional vehicle seat buckle arrangement, to permit both releasable separation and length adjustment.

As to the connecting means 43 which coacts between the rear of the support arrangements and the seat assembly, this connecting means 43 includes a hooklike catch member 102 which is fixed to the lower end of the support rod 88 and defines therein a rearwardly opening slot for accommodating therein a catch pin 103 which is fixed to and projects outwardly from the respectively adjacent side frame element 94 of the seat assembly. A spring-urged leverlike latch member 104 cooperates with the catch member 102 for normally closing the outer end of the slot to maintain the catch pin 103 confined within the hooklike catch member. A similar structure is also disclosed in my application Ser. No. 07/484,570 now U.S. Pat. No. 5,112,076.

Figure 2:
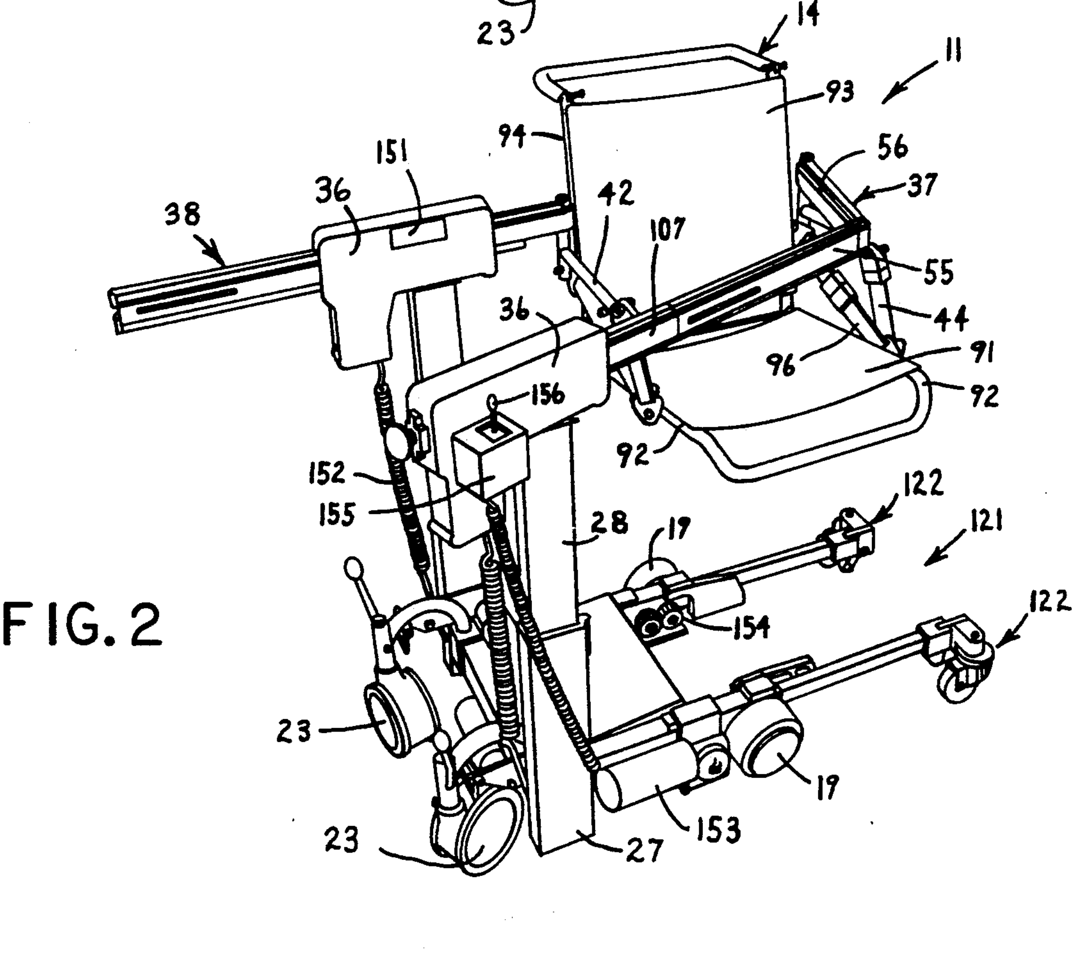
FIG. 2 is a perspective view which shows the wheelchair of FIG. 1 in its transfer position, in which position the posts have been raised and the seat assembly has been moved rearwardly and horizontally rotated through an angle of about 90°.

The wheelchair arrangement 11 of this invention is also provided with an auxiliary extension arm assembly 106 which can be releasably attached to the front end of either of the arm arrangements 37 or 38 when it is desired to move the seat assembly into the occupant transfer position illustrated by FIG. 2. This auxiliary extension arm assembly 106, however, is attached only when such transfer function is to be performed, and is otherwise removed from the wheelchair assembly whenever the wheelchair assembly is in its normal mode of use.

This extension arm assembly 106, as illustrated by FIG. 5, includes a horizontally elongate extension arm part 107 which has a cross section substantially identical to that of the front arm part 55 of the primary support arm 41. The rearward end of the extension arm part 107 has a generally vertically oriented alignment groove positioned centrally thereof and extending generally vertically thereacross. This extension arm part 107 also has an alignment projection or rod-like pilot portion 109 formed substantially as an elongated cylindrical rod which is fixed to the extension arm part and projects horizontally and longitudinally outwardly from the rearward end thereof.

To permit fixed connection of the extension arm assembly to one of the arm arrangements 37 or 38, such as the leftward arm arrangement 37 as illustrated in the drawings, the front end of the front arm part 109 has a generally V-shaped alignment projection 111 which projects outwardly in the forward direction, which alignment projection includes portions disposed both above and below the pilot opening 78. These alignment projections are sized so as to snugly fit in the alignment groove at the rear end of arm part 107, and at the same time the cylindrical rodlike pilot portion 109 formed on the extension arm part 107 is snugly slidably telescoped into the pilot opening 78 to create a rigid connection of the arm parts 55 and 107.

In addition to the connection of the arm parts 55 and 107 in the manner described above, the extension arm assembly 106 also includes a locking and latch-release structure associated therewith. This latter structure includes an elongate actuator rod 112 which extends longitudinally throughout the length of the extension arm part 107 and is suitably rotatably supported therein within a substantially cylindrical bore or opening 113. The forward end of this actuator rod 112 projects outwardly through the front end of the extension arm part 107 and is provided with a suitable actuating knob 114 or other suitable gripping element provided thereon. The rearward end of the actuator rod 112 is provided with an externally threaded portion 115, which portion normally projects outwardly beyond the free end of the cylindrical pilot portion 109 through a small extent, such as in the order of about 1 inch. When the cylindrical pilot portion 109 of arm part 107 is inserted into the pilot opening 78 of arm part 55, the free end of the threaded portion 115 aligns with and moves into contact with the threaded sleeve 79. The actuator rod 112 is then rotated to cause the threaded portion 115 to be threaded into the threaded sleeve 79. The length of this threaded portion 115, however, is slightly greater than the axial length of threaded sleeve 79 so that continued rotation of rod 112 causes the threaded portion 115 to project axially through and beyond the threaded sleeve 79 for a limited extent. This causes the arm part 107 to be pulled tightly into fixed and rigid engagement with the arm part 55, and also causes the threaded portion 115 to contact the forward end of the latch actuator rod 76 and displace it axially rearwardly a predetermined extent, which rearward displacement also moves the latch bolt 81 rearwardly against the urging of spring 83 so that the latch bolt 81 is retracted from engagement with the front hinge part 71. In fact, the sizing of the extension of threaded rod portion 115 beyond threaded sleeve 79, and the associated rearward displacement of the latching rods 76 and 81, is such that the opposed ends of the latching rods are moved into positions whereby the end surfaces are substantially flush with the concave and convex arcuate surfaces 84 and 85, thereby releasing the hinge means 57 so as to permit pivoting movement about the vertical hinge axis 74.

To provide increased stability and safety against tipping when the seat assembly is moved rearwardly from its normal position, such as when in the transfer position illustrated by FIG. 2, the wheelchair arrangement also includes a stabilizing rear wheel assembly 121 which can be removed significantly rearwardly from the rear support wheels 19 so as to provide a significantly increased front-to-back wheel base. The stabilizing rear wheel assembly includes a pair of auxiliary rear wheel assemblies 122, specifically swivel-type caster assemblies, with one of the caster assemblies 122 being normally maintained in an inoperative position wherein it is disposed closely adjacent the respective rear wheel assembly 19. Each auxiliary caster assembly 122 is mounted on the rearward end of a generally horizontally and forwardly extending extension arm 123 which slidably telescopes into the interior of the respective frame side leg 18. This latter side leg 18 has a rotatable drive screw mounted therein and positioned so as to extend into the hollow interior of the respective extension arm 123 when the latter is in the forward telescoped position. Drive screw 124 is drivingly engaged with a ball nut 125 which is fixed to the forward end of the extension arm 123. The forward end of this drive screw 124 is suitably drivingly engaged through suitable gearing with a drive shaft 126 which extends transversely of the base through the hollow base tube 16. This drive shaft 126 in turn is driven by a further drive motor 127, the latter being a reversible direct current motor driven from the battery power source. Drive motor 127 is effective for rotating the drive screws in the side legs so as to cause the extension arms 123 to move into a rearward extended position whereby the rear auxiliary caster assemblies 122 are hence spaced rearwardly a substantial distance from the rear wheel assemblies 19.

Figure 8:
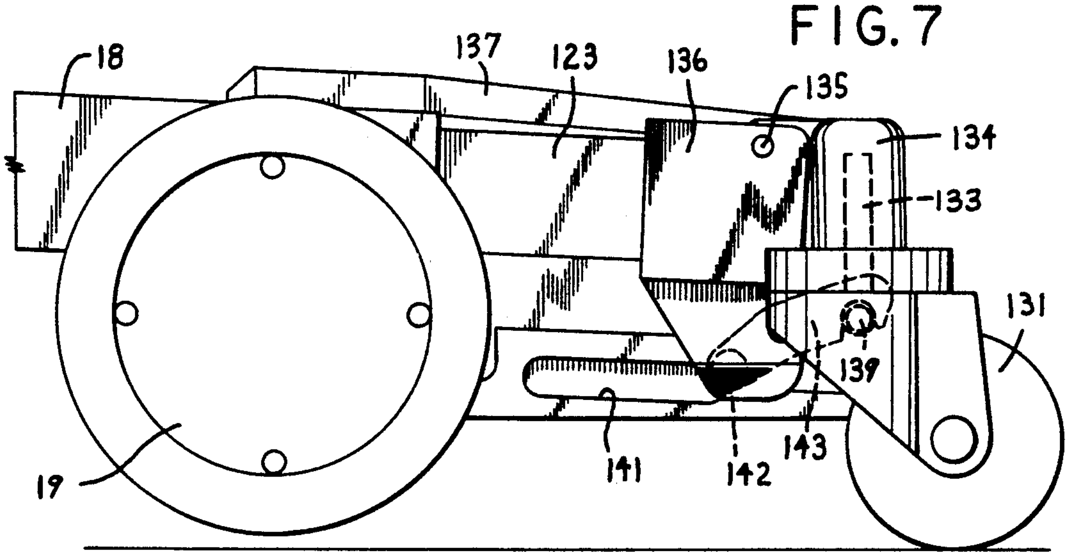
FIG. 8 is a fragmentary side elevational view similar to FIG. 7 but showing the rear stabilizing caster in a front load-supporting position.

The extension arms 123, and their slidable support within the respective side legs 18, is such that the extension arms 123 are supported for rearward slidable movement along a line of action 128 which is at a slight angular incline of about 2° to 5° relative to the horizontal (that is, relative to the horizontal plane defined by the supporting floor with which the front and rear wheel assemblies 23 and 19 are engaged). When the rear caster assemblies 122 are in the forward nonoperative position, the caster assemblies 122 are in a raised position so as to be in nonload-bearing engagement with the floor. As the extension arms 123 are extended rearwardly a small distance to an intermediate position, however, the auxiliary caster assemblies are lowered so as to be moved into load-bearing engagement with the floor to the extent as to cause a slight lifting of the rear wheel assemblies 19 to hence provide a very small clearance between the wheel assemblies 19 and the floor, such as shown in FIG. 8. The arms 123 can then be moved rearwardly a significant amount into the fully extended position of FIG. 2. When in this rearwardly extended position, the auxiliary rear casters 122 cooperate with the front casters 23 to thus provide support for the wheelchair assembly, and hence enable the entire wheelchair assembly to be displaced sidewardly, such as when the wheelchair is cooperating with a bed or the like so as to perform a patient transfer.

Figure 7:
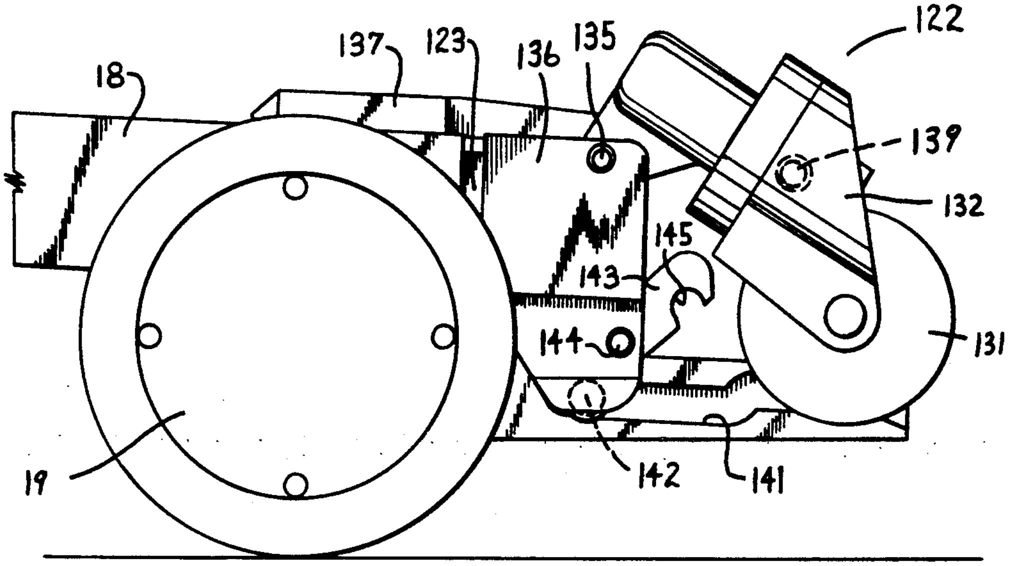
FIG. 7 is a fragmentary side elevational view showing the rear stabilizing caster assembly in a retracted or storage position.
Figure 9:
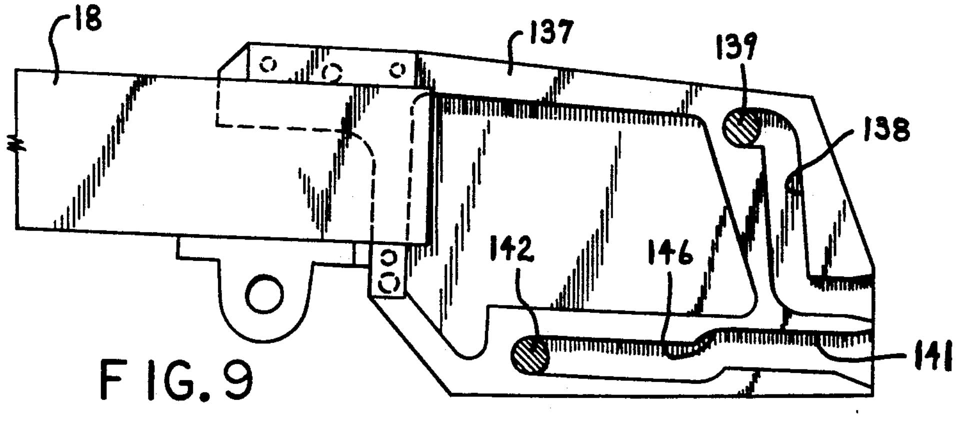
FIG. 9 is a fragmentary side elevational view showing the cam plate attached to the rear of the base side leg.

Considering the structure and operation of the rear stabilizing caster assemblies 122 in greater detail, and referring specifically to FIGS. 7–9, each caster assembly 122 as associated with the rearward end of each base side leg 18 includes a caster wheel 131 supported on a conventional caster horn 132 which has a swivel shaft 133 rotatably supported within a caster housing 134. This caster housing 134 in turn is connected by a sideward horizontal hinge 135 to a mounting block 136 which is fixed to the rearward end of the extension arm 123.

In the illustrated embodiment, the caster assembly 122 is movable into a raised inoperative position as illustrated by FIG. 7 when the extension arm 123 is in its forward or fully retracted position. To effect the raising and lowering of this caster assembly 122 between the raised inactive position of FIG. 7 and the lowered load-bearing position of FIG. 8, each base side leg 18 has a cam or control plate 137 fixed thereto and projecting rearwardly thereof. This cam plate 137 has a first generally Z-shaped cam groove 138 formed therein and opening outwardly through the rear edge of the cam plate. This cam groove cooperates with a cam pin 139 which is secured to and projects sidewardly from the side of the caster horn for cooperation with the cam groove 138. This cam pin 139 is disposed approximately midway between the hinge 135 and the rotational axis of the caster wheel.

When in the fully retracted storage position, the cam pin 139 is normally maintained in the upper leg of the Z-shaped cam slot 138, as illustrated in FIG. 9, thereby maintaining the caster in the raised position of FIG. 7 so that it is spaced upwardly from the floor. During initial rearward movement of the extension arm 123 through a small extent, however, the cam pin 139 moves vertically downwardly along the cam slot 138 into the lower leg so that the caster is moved into engagement with the floor, and further rearward movement of extension arm 123 causes the cam pin 139 to move rearwardly out of engagement with the cam slot 138.

To lock the caster in the lowered position so that it remains in supportive engagement with the floor, the caster assembly also includes a latching lever 143 which is mounted on the mounting block 136 by a centrally located pivot pin 144. This latch lever 143 has a slot 145 at the rearward end which is adapted to engage the cam pin 139. The other end of latch lever 143 has a cam pin 142 projecting sidewardly thereof and positioned for engagement with an elongate cam groove 141 formed in the cam block 137. This cam slot has generally horizontally extending front and rear portions which are joined by a slight vertical offset 146 so that the rear portion is spaced slightly above the front portion of the cam slot. As the cam pin 142 moves rearwardly of slot 141 due to rearward extension of the arm 123, the cam pin 142 enters the offset portion 146 and swings the latch lever 143 downwardly, which movement occurs just after the cam pin 139 has been lowered and effectively swung into a position beneath the latching slot 145. This lowering of the latching lever 143 then effectively causes the cam pin 139 to become captivated in the slot 145, which latter slot is slightly offset from the vertical so as to effectively captivate the cam pin 139 and hence lock the caster assembly in a lowered load-bearing position even after the cam pins 139 and 142 move out of engagement with the cam plate 137.

During movement of the rear caster assembly from the retracted storage position of FIG. 7 into the lowered load-bearing position of FIG. 8, the configuration of the cam slot 138 and its cooperation with the cam pin 139 is such as to cause the caster 131 to assume at least a partial load-bearing engagement with the floor, and effect at least a partial relief of the load and in fact a partial lifting of the rear wheel 19. As the rear caster assemblies are moved further rearwardly from the position of FIG. 8 into the fully extended rear position, the slight downward slope of the line of movement of the rear extension arms 123 causes additional lifting of the rear wheels 19.

This rear caster assembly 122 is provided with the lifting cam structure so as to move it into the raised storage position of FIG. 7 preferably only when the wheelchair arrangement is provided with powered driving for the rear wheels 19. However, if the wheelchair arrangement is not of the self-propelled type, then the rear caster assembly can be permitted to remain in engagement with the floor directly behind the rear wheels 19 to provide additional stability without interfering with the normal mode of operation of the wheelchair. In this latter variation, the cam plate 137 is omitted, and the caster housing 134 is rigidly mounted directly to the block 136 so that the caster wheel 131 is maintained substantially in contact with the floor but may be slightly raised relative thereto so as to not interfere with the normal load-bearing contact of the rear wheels 19.

When the wheelchair is to be of the self-propelled or self-driving type, then a suitable reversible DC electric drive motor 153 is associated with each side leg 18 of the frame and is suitably energized from the control/power box 16. Each drive motor 153 is drivingly connected through a suitable gear mechanism 154 with the respective rear wheel assembly 19. The drive motors 153 associated with the rear wheel assemblies 19 can be individually controlled by means of a switch control box 155 which is preferably removably attached within a mounting bracket secured to the outer upper side of the one top post 28. This control box 155 has a joystick controller 156 which when pivoted straight forwardly energizes both motors 153 to cause forward driving of both rear wheels 19, and similarly when moved straight rearwardly energizes both motors reversely so as to cause rearward movement of the wheelchair. Similarly, when the joystick is deflected leftwardly, then the right-side drive motor is forwardly energized to cause the wheelchair arrangement to turn leftwardly, and a similar function is performed when the joystick is deflected rightwardly so as to turn the wheelchair rightwardly. This driving and controlling of the wheelchair through a joystick controller is conventional.

To provide for control over the movement of the wheelchair, including movement of the arm arrangements, the wheelchair arrangement is provided with a touch-sensitive control panel mounted on the inside vertical surfaces of each of the support housings 36. This control panel 151 has a plurality of individual touch-sensitive control switches associated therewith for controlling various wheelchair functions. This control panel as associated with each support housing is joined by a suitable flexible control cable 152 to the control/power box 16. Each panel 151 includes two switches for controlling the extendible post arrangements 25 and 26, one an "up" switch and the other being a "down" switch. Depression of either one of the "up" or "down" switches is sufficient to permit energization of the drive motor 34 so as to respectively cause either upward or downward synchronous movement of the upper support posts 28.

Each control panel 151 also has a further pair of switches with each pair including a first switch for controlling forward movement of the respective support arm arrangement 37 or 38, and the other switch being provided for controlling rearward movement of the respective support arm arrangement.

The control panel 151 also has a further pair of touch-sensitive switches associated therewith, one being depressed for controlling the rearward extension of the rear stabilizing casters 122, and the other being utilized for controlling the forward retraction of the rear stabilizing casters.

As illustrated by FIGS. 1 and 2, the vertical region or space between the rear of the base 12 and the seat portion 91 is substantially open and unobstructed. That is, this region as defined rearwardly of the upright post arrangements is open and unobstructed in both sideward directions and in the rearward direction. Further, the rear side legs 18 of the base, rearwardly of the control box 16, also define a rearwardly opening unobstructed space between the rear wheels, including between the rear stabilizing casters. These unobstructed region and space thus greatly facilitate use of the wheelchair arrangement by facilitating movement thereof into close proximity with some other object such as a toilet, a vehicle, a bed or a similar such object. For example, the open space below the seat portion 19 coupled with the rearwardly-opening region between the side legs of the base enable the rear portion of the wheelchair to effectively straddle a conventional toilet, particularly when the seat is moved rearwardly and the rear stabilizing casters have been moved rearwardly to the intermediate position. Further, this rearwardly opening space and the manner in which the base legs project rearwardly in cantilevered fashion enables the wheelchair seat to be positioned over a bed, and the legs projected under the bed, to facilitate transfer of a patient between the wheelchair and the bed. This same relationship also facilitates transfer of a person between a vehicle seat and the wheelchair.

Operation

The operation of the wheelchair arrangement according to the present invention will be briefly described to ensure a more complete understanding thereof.

The wheelchair arrangement 11 will normally be utilized in a position substantially as illustrated by FIG. 1, in which position the post assemblies 25–26 are at or close to their lowered positions, and the arm arrangements 37–38 are in their normal position wherein they project forwardly a small extent beyond the support housings 36, and the front edge of the seat portion 91 projects into the region between the post assemblies 25–26. In this condition, a person can readily enter or exit the seat assembly 14 since the seat assembly opens freely outwardly between the post assemblies 25–26 in an unobstructed manner.

If the occupant wishes to move the wheelchair about, and assuming that it is a self-propelled version, then the operator can use the joystick 156 associated with the control box 155 so as to both control energization of the rear wheels and simultaneously use this joystick to steer the wheelchair either rightwardly or leftwardly.

If the wheelchair occupant wishes to raise the seat assembly 14, such as to gain access to or permit viewing at a higher elevation, then the occupant can press the appropriate "up" switch associated with one of the control panels 151 to energize motor 34 whereby both upper support posts 28 are simultaneously moved upwardly and cause a corresponding lifting of the seat assembly 14.

The operations of the wheelchair involving rearward movement of the seat assembly 14, particularly when such rearward movement is for purposes of permitting transfer of a person to or from the wheelchair seat, will now be described with reference to FIGS. 10A–10F.

Figures 10A, 10B, 10C, 10D, 10E, 10F:
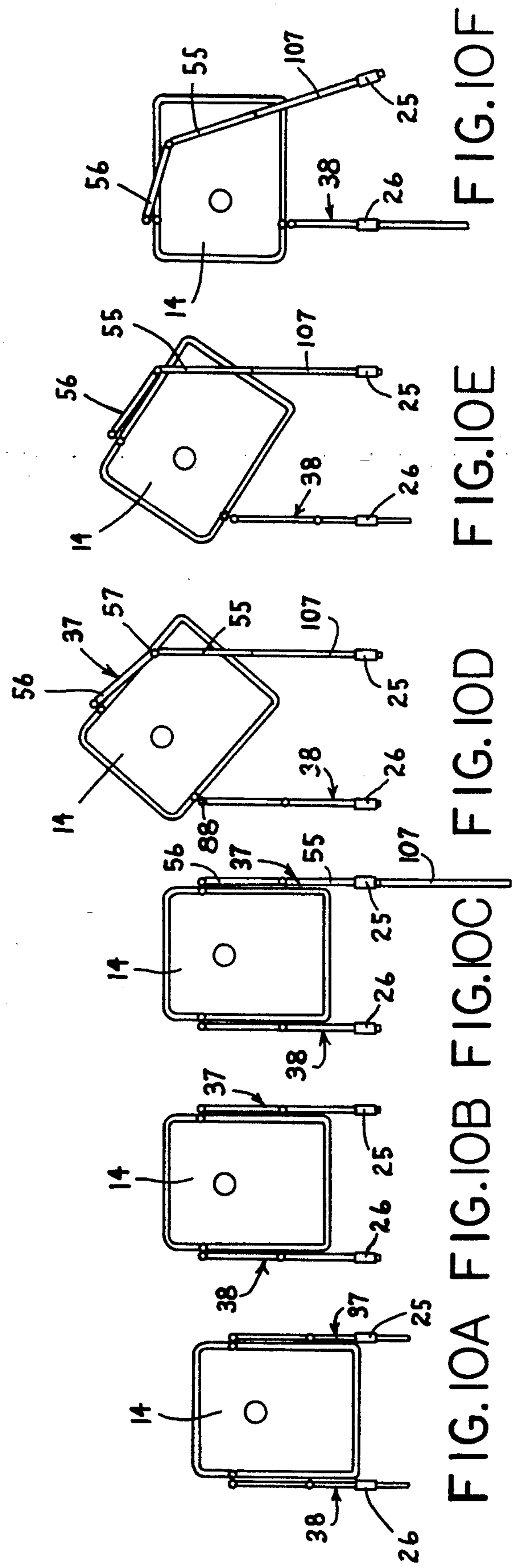
FIGS. 10A–10F show six top diagrammatic views of the positions assumed by the seat assembly of the wheelchair arrangement as the seat assembly is moved from the normal position of FIG. 1, as diagrammatically depicted in FIG. 10A, to the transfer position of FIG. 2, as diagrammatically depicted by FIG. 10F.

Referencing FIG. 10A, this grammatically illustrates, in top view, the normal position of the wheelchair arrangement. That is, the seat assembly 14 is disposed in its normal forward position wherein the seat portion 91 projects into the region between the pair of sidewardly spaced post assemblies 25–26.

From the normal position illustrated by FIG. 10A, the seat assembly 14 can be moved rearwardly a limited extent (for example, about six inches) relative to the base, whereby the seat assembly will assume the position diagrammatically illustrated in FIG. 10B. However, so as to maintain maximum stability, the rear stabilizing assembly 121 is initially moved rearwardly a small extent (such as about three inches) to an intermediate stabilizing position whereby the casters 122 are now spaced rearwardly a predetermined distance from the rear wheels 19 and are swung downwardly into load-bearing engagement with the floor. This hence increases the front-to-back dimension of the supporting wheel base of the wheelchair arrangement to compensate for the rearward movement of the seat assembly.

To effect movement to the position illustrated by FIG. 10B from the position illustrated by FIG. 10A, the switch on control panel 151 which controls rearward extension of the auxiliary casters 122 is energized, thereby causing energization of the drive motor 127 to cause the extension arms 123 and the rear casters 122 mounted thereon to move outwardly until reaching the intermediate stabilizing position, at which time the drive motor 127 is de-energized. Thereafter the rearward seat movement switch associated with control panel 151 is manually actuated so as to cause energization of the drive motors 63 associated with both support arm arrangements 37–38. This energization of motors 63, due to driving engagement of the drive gears 65 with the gear racks 66, causes both arms 37–38 to be simultaneously linearly moved rearwardly a predetermined distance until the front free ends of the front arm parts 55 are located closely adjacent the front ends of the support housing 36. When reaching this position, the latching dogs 68 drop into the openings 69 and prevents further rearward movement of the arms. When in this rearward position, the wheelchair arrangement is particularly suitable for use with a conventional toilet since the wheelchair can be moved rearwardly so as to straddle a toilet and hence enables the occupant to use the toilet without leaving the wheelchair. For such function, the wheelchair will be provided with a seat portion 91 having a toilet-seat attachment associated therewith, as described in detail in my copending application Serial No. 07/749,153.

When it is desired to move the seat assembly 14 of the wheelchair arrangement into a patient transfer position substantially as illustrated by FIG. 2, then the auxiliary extension arm assembly 106 must first be attached to a selected one of the arms 37 or 38, depending upon which direction of movement of the seat assembly is desired. Assuming that the seat assembly 14 is to be swung to the left, then the extension arm assembly 106 will be attached to the front end of the arm 41 associated with the left arm arrangement 37. The attachment of the auxiliary arm assembly to the front end of the arm 41 can occur either when the arm is in the normal position of FIG. 10A, this being the preferably attachment position, or when the arm is in the retracted position of FIG. 10B.

To attach the extension arm assembly 106, the cylindrical pilot projection 109 thereof is inserted into the pilot opening 78 so as to cause the alignment projections 109 to project into the alignment groove on the rearward end of the extension arm part. The knob 114 is rotated to cause the threaded portion 115 of actuator rod 112 to thread into and through the threaded sleeve 79 and until the threaded portion 115 moves the actuator rod 76 and latching rod 81 rearwardly so as to effect unlocking of the hinge means 57. During this rearward movement of the actuator rod 76, the pin 86A thereon reacts with the inclined cam groove on the cam plate 89 causing the latter to be lifted upwardly so as to totally close off the opening 69 to permit the latch dog 68 to pass directly thereover.

Assuming that the extension arm assembly 106 is mounted on the arm arrangement 38 and that the seat assembly is in or has reached the rearward position as shown in FIG. 10C, then activation of the rearward movement seat switch causes energization of solely the drive motor 63 associated with the support housing 36 of the arm arrangement 37. Only the arm 41 of arm arrangement 37 is moved rearwardly causing the extension arm part 107 to be slidably moved into the tunnel-like opening 53 defined by the support housing 36 due to the drive gear 65 moving into meshing engagement with the gear rack 116 formed on the underside of the extension arm part 107. This causes the arm 41 of arm arrangement 37 to be moved rearwardly a predetermined extent beyond the intermediate rearward position of FIG. 10C. During this rearward movement of the arm arrangement 37, the other arm arrangement 38 remains stationary, and hence the seat assembly 14 tends to pivot horizontally rightwardly about the pivotal connection defined by shaft 88 at the rearward free end of the stationary arm arrangement 38, thus causing the rear arm part 56 of arm arrangement 37 to swing inwardly about the hinge 57 through a limited angle, as limited by the hinge structure. When the arm arrangement 37 reaches the maximum angled or bent position, the hinge stops 86–87 prevent further inward swinging movement of the rear arm part 56. Continued rearward movement of the front arm part 55 cause further sideward swinging of the seat assembly into the position substantially as illustrated by FIG. 10D, in which position the seat is sidewardly oriented substantially at a 45°.

Prior to moving the seat rearwardly from the position of FIG. 10C to the position of FIG. 10D, however, the microprocessor controller first requires that the switch controlling rearward movement of the rear stabilizing casters be depressed for effecting further rearward extension of the auxiliary casters 122 into their fully extended rearwardmost position substantially as illustrated by FIG. 2, in which position the casters are disposed in load-bearing support with the floor at a location which is spaced from the rear wheels 19 by a distance which is about twice as great as the spacing between the rear wheels and the rear casters when the latter are in the intermediate position of FIG. 8. Only when the rear auxiliary casters reach this rearwardmost position will the microprocessor then permit the appropriate motor to be energized so as to move the seat assembly from the FIG. 10C position into the FIG. 10D position.

When the arm arrangement 37 reaches the FIG. 10D position, the arm extension 107 is now supported substantially entirely within the support housing 36, and the connected front arm part 55 is disposed substantially entirely rearwardly of the respective support housing 36. As a safety feature, the latching dog 68 will fall down into a top opening 117 formed in the auxiliary part 107 so as to prevent any further rearward movement thereof.

After reaching the position of FIG. 10D, then the arm forward movement switch associated with the control panel 115 of the rightward arm arrangement 38 is energized to move the arm 41 of the rightward arm arrangement 38 forwardly into and then through the normal position (FIG. 10E) until the arm 41 projects outwardly of the respective support housing 36 by a distance which is almost twice the normal amount of projection as shown in FIG. 10F. During this forward movement of the arm arrangement 38, the seat assembly 14 and the other arm arrangement 37 are swung substantially as a unit horizontally inwardly about the pivot 49 associated with the support housing 36 of the arm arrangement 37, thus causing the seat assembly to be rotated into a position substantially as illustrated by FIG. 10F, in which position the seat assembly is now oriented generally sidewardly and has been rotated through an angle of approximately 90°.

Assuming the seat assembly is in a raised position, has an occupant therein, and has been rotated into the transfer position of FIG. 10F, then the wheelchair can be positioned adjacent one side of a bed so that the bed projects into the open space under the seat assembly. The seat assembly can then be lowered until contacting the bed to relieve the weight of the occupant and seat assembly from the connecting means which join the seat assembly to the arm arrangements. The connecting means 43 and 44 can be released to totally disconnect the seat assembly 14 from the support arm arrangements 37–38, following which the arm arrangement 37 can be manually swung outwardly into a straight condition in parallel relationship with the other arm arrangement 38, the arms are lifted slightly upwardly so that the secondary arms can pass over the patient's legs, and the wheelchair is then moved away from the bed. The seat assembly 14 can then have the back portion 93 thereof laid down to place the patient in a prone position, following which the patient can be transferred from the seat assembly directly onto the bed. The seat assembly can then be easily reattached to the arm arrangements of the wheelchair.

Conversely, if it is desired to pick up a patient from the bed, then substantially a reverse operational sequence is utilized.

A similar operation sequence is also utilized for transferring the seat assembly, including an occupant seated therein, between the wheelchair and a vehicle seat.

While the previous description discloses the auxiliary arm assembly 106 being attached to the arm arrangement 37 so as to permit leftward swinging of the seat assembly, it will be appreciated that this same auxiliary arm assembly 106 can instead be attached to the other arm arrangement 38 so as to permit swinging movement of the seat assembly to the right. Further, while the disclosed wheelchair arrangement provides identical arm arrangements 37 and 38 so as to permit selective swinging of the seat assembly either rightwardly or leftwardly, it will be appreciated that the invention also encompasses a wheelchair whereby only one arm arrangement is provided with a hinge so as to permit swinging of the seat assembly sidewardly in only one direction.

To provide control and safety over the operation of the wheelchair arrangement, and specifically to define the various positions of the arm arrangements, it will be recognized that various position sensors will be provided on the arms so as to provide signals to the control unit to ensure that the arm arrangements and rear stabilizing wheels can be and are moved only in the proper sequence. For example, each front arm 55 may be provided with an elongate magnetic strip thereon of a length substantially corresponding to the normal rearward displacement of the arms when moving from the normal position of FIG. 10A to the position of FIG. 10B. This magnetic strip will cooperate with a pair of sensors provided on the respective support housing 36 to hence permit detection of when the arms are in the FIG. 10A or FIG. 10B position. These same sensors will also detect when one of the arms is moved forwardly beyond its normal position, such as the forward position diagrammatically illustrated by the arm arrangement 38 in FIG. 10F. Sensors can also be provided for cooperation with the drive shaft 126, including a rotating screw and traveling nut arrangement, so as to determine the positions of the rear extension arms 123. Similar sensors which can be responsive to and count the rotations of the drive gears 65 can also be provided so as to permit determination of the position of the individual arm arrangements 37 and 38. Such position sensors and controls are conventional and well understood, and can take many forms and variations, so that further detail description thereof is believed unnecessary.

The wheelchair arrangement can be conveniently folded or collapsed for storage or transport. With the seat assembly detached from the arms, the stop pin 30B can be removed, thus permitting the upright assembly to swing downwardly (clockwise in FIG. 3) about the axis of cross tube 24 so as to overlie the base. Prior to such downward swinging, the arm arrangements are swung inwardly generally toward one another so as to extend across the wheelchair arrangement.

While the telescopic post assemblies are disclosed as employing powered ball-screw arrangements for effecting raising and lowering, it will be appreciated that numerous other types of drive arrangements can be utilized in place of ball-screw drives. For example, pressure cylinders and/or manual drives can be provided. Alternatively, the drive may employ an air spring associated with each post so as to at least partially balance the weight of the seat assembly and patient by imposing a constant upward urging force, with the air spring being used in conjunction with a manual drive mechanism such as a crank mechanism to provide the additional force necessary to effect raising or lowering of the seat assembly.

In addition, each of the upright post assemblies is preferably provided with a releasable latch or lock disposed for cooperation between the upper post 28 and the support housing 36 to normally prevent horizontal swinging of the support housing 36 about the pivot axis 49. Such lock may comprise a latch pin which is mounted on but vertically spring-urged upwardly from the upper post 28 so that the upper end of the latch pin is engaged within an elongate groove formed in the underside of arm part 55 and extending longitudinally therealong. By projection of the upper end of such lock pin into the groove on arm 55, such prevents pivoting of the arm part about pivot axis 49. Such groove is of a length so as to permit the normal forward and rearward movement of the arm, such as permitted when the auxiliary arm extension is not applied. The groove is provided with a cam ramp at the forward end thereof, however, so that when the auxiliary arm extension is attached, the lock pin can be cammed out of the groove and hence permit free pivoting of the respective arm arrangement about the pivot axis 49, such as is required when the auxiliary arm arrangement is attached and the chair is utilized so as to perform a patient transfer as illustrated by the sequential positions of FIGS. 10A–10F. Such arrangement would maintain the two arms normally locked against horizontal rotation, and would permit horizontal rotation of only the arm arrangement to which the auxiliary arm extension is attached.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wheelchair arrangement, comprising:

a wheeled base assembly having front and rear ends, and opposite sides;

an upright assembly mounted to and projecting upwardly from said base assembly, said upright assembly including a pair of upright post arrangements positioned adjacent opposite sides of said base assembly and projecting upwardly therefrom in generally parallel relationship;

a pair of generally parallel and horizontally-elongated support arm arrangements disposed in sidewardly spaced relationship so as to be positioned generally over opposite sides of said base assembly, each said arm arrangement being disposed adjacent and cooperating with an upper end of one of said upright post arrangements and projecting generally horizontally in a cantilevered manner away from the respective post arrangement toward one of the ends of the base assembly;

an occupant-accommodating seat assembly releasably attached to and positioned between said pair of support arm arrangements, said seat assembly including a seat portion which defines thereon an enlarged upwardly facing surface which is provided for engaging an occupant, said seat portion being positioned generally downwardly from the elevation of said support arm arrangement;

mounting means cooperating between each said support arm arrangement and the upper end of the respective post arrangement for permitting substantially horizontal movement of the support arm arrangement along a longitudinal direction thereof relative to the respective post arrangement; and driving means associated with each said arm arrangement for drivingly moving the respective arm arrangement relative to the respective post arrangement along the longitudinal direction of the arm arrangement.

2. A wheelchair arrangement according to claim 1, wherein at least one of said arm arrangements includes first and second horizontally-elongated arm parts which have adjacent ends coupled together by a hinge means which define a generally vertical hinge axis for enabling the first and second arm parts to horizontally swing relative to one another, said seat assembly being releasably coupled to said first arm part adjacent a free end thereof, and said second arm part being normally supportingly but movably engaged with said mounting means.

3. A wheelchair arrangement according to claim 2, including horizontally elongate arm extension means releasably but fixedly connectable to a front free end of said second arm part, said arm extension means including a generally horizontally elongate extension arm part which is fixedly and rigidly connectable to the front free end of said second arm part so as to be rigidly joined thereto and aligned therewith, said extension arm part being longitudinally horizontally movable into engagement with said driving means to effect linear movement of said one arm arrangement through a greater horizontal extent to cause relative hinging between said first and second arm parts and corresponding sideward swinging of said seat assembly.

4. A wheelchair arrangement according to claim 3, wherein said mounting means as associated with said one arm arrangement permits said one arm arrangement to horizontally swing relative to the other arm arrangement about a vertical pivot axis defined in a vicinity of the respective post arrangement when the arm extension means is attached to said one arm arrangement.

5. A wheelchair arrangement according to claim 3, including latch means cooperating with said hinge means for normally locking said hinge means so as to maintain said first and second arm parts in an aligned and rigid relationship, and release means cooperating with said latch means and activated only when said arm extension means is mounted on said second arm part for releasing said latch means.

6. A wheelchair arrangement according to claim 3, wherein each post arrangement includes a lower post member which is vertically stationarily mounted relative to said base assembly, and an upper post member which is vertically raiseable and lowerable relative to the lower post member, said arm arrangements being mounted to said upper post members adjacent upper ends thereof, and a drive device drivingly coupled to said pair of post assemblies for effecting simultaneous raising or lowering of the upper post members.

7. A wheelchair arrangement according to claim 1, wherein each said support arm arrangement includes a generally horizontally elongated primary arm which in a vicinity of one end thereof is supported by the respective mounting means for movement in the longitudinal direction thereof relative to the respective post arrangement, each said primary arm adjacent the other end thereof mounting thereon a generally horizontally elongated secondary arm which projects forwardly in cantilevered relationship and extends normally in generally parallel relationship to said primary arm, said secondary arm terminating in a front free end, and said seat assembly having the seat portion thereof coupled to said secondary arm in the vicinity of said free end thereof, and said secondary arm being horizontally swingable relative to said primary arm.

8. A wheelchair arrangement according to claim 7, wherein at least one of said primary arms includes first and second elongated arm parts which have adjacent ends hingedly connected together, said secondary arm being hingedly coupled to a free end of said second arm part, and said first arm part being normally movably supported by said mounting means.

9. A wheelchair arrangement according to claim 1, wherein said wheeled base assembly includes a pair of front caster assemblies mounted adjacent opposite front corners of said base assembly, said base assembly including a pair of generally parallel side legs which extend approximately horizontally and project rearwardly in cantilevered relationship so as to define a rearwardly-opening space therebetween, and a rear wheel assembly associated with each side leg, said rear wheel assembly having adjustment means associated therewith for permitting movement of the rear wheel assembly between a front position and a rear floor-engaging position, said rear wheel assembly when in said front position being disposed closely adjacent a rearward free end of said side leg, said rear wheel assembly when in said rear position being spaced rearwardly a significant distance from said front position, said adjustment means including an extension leg which is movably supported on the respective side leg and mounts thereon the respective rear wheel assembly adjacent a rear end thereof, said extension leg being movable relative to the respective side leg between said front and rear positions, and a driving mechanism coupled to and controlling movement of said extension legs relative to said side legs.

10. A wheelchair arrangement according to claim 9, wherein said rear wheel assembly comprises a caster assembly which can swivel about a generally vertical axis.

11. A wheelchair arrangement according to claim 10, including a drive wheel assembly mounted on each side leg of said base assembly adjacent a rear end thereof, a drive source drivingly coupled to said drive wheel assembly for permitting self-driving of the wheelchair arrangement, and mounting means cooperating between said rear wheel assembly and said side leg for effecting lifting of the rear wheel assembly out of load-bearing engagement with the floor when the extension leg is moved inwardly a small extent from said front position.

12. A wheelchair arrangement according to claim 11, wherein said extension leg is supported at a slight angle relative to the horizontal so as to effectively lower the rear wheel assembly when moved into said rear position so as to effect raising of said drive wheel assembly out of engagement with the floor.

13. A wheelchair arrangement according to claim 12, wherein said extension legs project rearwardly in a cantilevered manner from the respective side legs of the base assembly so as to define therebetween a region which constitutes an extension of the space between the side legs and which opens freely rearward in an unobstructed manner.

14. A wheelchair arrangement, comprising:

a wheeled base assembly having front and rear ends, and opposite sides;

an upright assembly mounted to and projecting upwardly from said base assembly, said upright assembly including a pair of upright post arrangements positioned adjacent opposite sides of said base assembly and projecting upwardly therefrom in generally parallel relationship;

said wheeled base assembly includes a pair of front caster assemblies mounted adjacent opposite front corners of said base assembly;

said base assembly also including a pair of generally parallel side legs which project rearwardly in cantilevered relationship so as to define a rearwardly-opening space therebetween, and a rear wheel assembly associated with each side leg;

adjustment means associated with said rear wheel assemblies for permitting movement thereof between a front position and a rear floor-engaging position, said rear wheel assembly when in said front position being disposed closely adjacent a rearward free end of said side leg, said rear wheel assembly when in said rear position being spaced rearwardly a significant distance from said front position, said adjustment means including an extension leg which is movably supported on the respective side leg and mounts thereon the respective rear wheel assembly adjacent a rear end thereof, said extension leg being movable relative to the respective side leg between said front and rear positions, and a driving mechanism coupled to and controlling movement of said extension legs relative to said side legs;

a pair of support arm arrangements disposed in sidewardly spaced relationship so as to be positioned generally over opposite sides of said base assembly, each said arm arrangement being disposed adjacent and cooperating with an upper end of one of said upright post arrangements; and an occupant-accommodating cost assembly attached to and positioned between said pair of support arm arrangements, said seat assembly including a seat portion which defines thereon an enlarged upwardly facing surface which is provided for engaging an occupant, said seat portion being positioned generally downwardly from the elevation of said support arm arrangement.

15. A wheelchair arrangement according to claim 14, wherein said rear wheel assembly comprises a caster assembly which can swivel about a generally vertical axis.

16. A wheelchair arrangement according to claim 15, including a drive wheel assembly mounted on each side leg of said base assembly adjacent a rear end thereof, a drive source drivingly coupled to said drive wheel assembly for permitting self-driving of the wheelchair arrangement, and mounting means cooperating between said rear wheel assembly and said side leg for effecting lifting of the rear wheel assembly out of load-bearing engagement with the floor when the extension leg is moved inwardly a small extent from said front position.

17. A wheelchair arrangement according to claim 16, wherein said extension leg is supported at a slight angle relative to the horizontal so as to effectively lower the rear wheel assembly when moved into said rear position so as to effect raising of said drive wheel assembly out of engagement with the floor.

18. A wheelchair arrangement, comprising:

a wheeled base assembly having front and rear ends, and opposite sides;

an upright assembly mounted to and projecting upwardly from said base assembly, said upright assembly including a pair of upright post arrangements positioned adjacent opposite sides of said base assembly and projecting upwardly therefrom in generally parallel relationship;

a pair of generally parallel and horizontally-elongated support arm arrangements disposed in sidewardly spaced relationship so as to be positioned generally over opposite sides of said base assembly, each said arm arrangement being disposed adjacent and cooperating with an upper end of one of said upright post arrangements and projecting generally horizontally in a cantilevered manner away from the respective post arrangement toward one of the ends of the base assembly;

an occupant-accommodating seat assembly releasably attached to and positioned between said pair of support arm arrangements, said seat assembly including a seat portion which defines thereon an enlarged upwardly facing surface which is provided for engaging an occupant, said seat portion being positioned generally downwardly from the elevation of said support arm arrangement; and one of said arm arrangements including first and second horizontally-elongated arm parts which have adjacent ends coupled together by a hinge means which define a generally vertical hinge axis for enabling the first and second arm parts to horizontally swing relative to one another, said seat assembly being releasably coupled to said first arm part, and said second arm part being normally supportingly engaged with the upper end of the respective post arrangement.

19. A wheelchair arrangement according to claim 18, wherein said arm arrangements are supported for substantially horizontal swinging movement relative to the respective post arrangements.

20. A wheelchair arrangement, comprising:

a wheeled base assembly having front and rear ends, and opposite sides;

an upright assembly mounted to and projecting upwardly from said base assembly, and means cooperating between said upright and base assemblies for normally maintaining the upright assembly in an upright position;

said upright assembly including a pair of upright post arrangements positioned adjacent opposite sides of said base assembly and projecting upwardly therefrom in generally parallel and cantilevered relationship;

pivot means coacting between said base and upright assemblies for defining a generally horizontal pivot axis which extends sidewardly across the base assembly adjacent lower ends of said post arrangements for enabling the upright assembly to be folded downwardly;

a pair of generally parallel and horizontally-elongated support arm arrangements disposed in sidewardly spaced relationship so as to be positioned generally over opposite sides of said base assembly, each said arm arrangement being disposed adjacent and cooperating with an upper end of one of said upright post arrangements and projecting generally horizontally in a cantilevered manner away from the respective post arrangement toward one of the ends of the base assembly;

an occupant-accommodating seat assembly releasably attached to and positioned between said pair of support arm arrangements, said seat assembly including a seat portion which defines thereon an enlarged upwardly facing surface which is provided for engaging an occupant, said seat portion being positioned generally downwardly from the elevation of said support arm arrangement; and mounting means cooperating between each said support arm arrangement and the upper end of the respective post arrangement for permitting substantially horizontal swinging movement of each said support arm arrangement about a substantially vertical pivot axis so as to permit the arm arrangements to be folded inwardly toward one another prior to folding of said upright assembly.

21. A wheelchair arrangement according to claim 20, wherein said arm arrangement includes a horizontally elongated main arm which is supported on the upper end of the respective post arrangement and projects horizontally in cantilevered fashion away therefrom and terminates in a free end, and a horizontally elongate secondary arm which at one end is connected by a vertical pivot axis to the main arm adjacent the free end thereof, said secondary arm projecting away from said vertical pivot axis and terminating in a free end, first releasable coupling means connected between said seat portion and said secondary arm adjacent the free end thereof, and second releasable coupling means cooperating between said seat assembly and said arm arrangement in a vicinity of the vertical pivot axis between said main and secondary arms, said second releasable coupling means permitting said seat assembly to horizontally pivot relative to said arm arrangement.

22. A wheelchair arrangement, comprising:

a wheeled base assembly having front and rear ends, and opposite sides;

an upright assembly mounted to and projecting upwardly from said base assembly, said upright assembly including a pair of upright post arrangements positioned adjacent opposite sides of said base assembly and projecting upwardly therefrom in generally parallel and cantilevered relationship;

a pair of generally parallel and horizontally elongated support arm arrangements disposed in sidewardly spaced relationship so as to be positioned generally over opposite sides of said base assembly, each said arm arrangements being disposed adjacent and cooperating with an upper end of one of said upright post arrangements and projecting generally horizontally away from the respective post arrangement toward one of the ends of the base assembly;

an occupant-accommodating seat assembly releasably attached to and positioned between said pair of support arm arrangements, said seat assembly including a seat portion which defines thereon an enlarged upwardly facing surface which is provided for engaging an occupant, said seat portion being positioned downwardly from the elevational of said support arm arrangements and disposed so that a part of the seat portion is positioned between or closely adjacent the post arrangements when in a normal use position; and means associated with said arm arrangements for effecting movement of said seat assembly generally horizontally in the front-to-rear direction of the wheelchair arrangement away from said normal use position and for effecting horizontal pivoting movement of the seat assembly sidewardly relative to the base assembly so that the seat assembly is oriented transversely relative to the front-to-rear direction of the wheelchair arrangement.

23. A wheelchair arrangement according to claim 22, wherein said arm arrangement includes a horizontally elongated main arm which is supported on the upper end of the respective post arrangement and projects horizontally in cantilevered fashion away therefrom and terminates in a free end, and a horizontally elongate secondary arm which at one end is connected by a vertical pivot axis to the main arm adjacent a free end thereof, said secondary arm projecting away from said vertical pivot axis and terminating in a free end, first releasable coupling means connected between said seat portion and said secondary arm adjacent the free end thereof, and second releasable coupling means cooperating between said seat assembly and said arm arrangement in a vicinity of the vertical pivot axis between said main and secondary arms, said second releasable coupling means permitting said seat assembly to horizontally pivot relative to said arm arrangement.

24. A wheelchair arrangement according to claim 22, wherein said arm arrangements are supported for substantially horizontal movement relative to the respective post arrangements, and an auxiliary extension arm assembly attachable to one of said arm arrangements for effectively extending the length thereof to increase the horizontal movement of said one arm arrangement relative to the respective post arrangement.

25. A wheelchair arrangement according to claim 23, wherein said arm arrangements are supported for substantially horizontal movement relative to the respective post arrangements, and an auxiliary extension arm assembly attachable to one of said arm arrangements for effectively extending the length thereof to increase the horizontal movement of said one arm arrangement relative to the respective post arrangement.

26. A wheelchair arrangement according to claim 25, including releasable latch means cooperating with the main and secondary arms of each said arm arrangement for normally maintaining the arms in a rigid horizontally aligned relationship, and release means provided on said auxiliary extension arm assembly and cooperating with the latch means when the extension arm assembly is attached to said one arm arrangement for releasing said latch means to permit relative horizontal swinging movement between said main and secondary arms about the vertical pivot axis.

27. A wheelchair arrangement according to claim 26, wherein the arm arrangements are supported for horizontal swinging movement relative to the respective post arrangements.

* * * * *

UNITED STATES PATENT AND TRADEMARK OFFICE
CERTIFICATE OF CORRECTION

PATENT NO. : 5 201 377

DATED : April 13, 1993

INVENTOR(S) : Harold R. WILSON

It is certified that error appears in the above-identified patent and that said Letters Patent is hereby corrected as shown below:

Column 21, line 67; change "cost" to ---seat---.

Column 23, Line 60; change "a" to ---the---.

Signed and Sealed this

First Day of February, 1994

Attest:

BRUCE LEHMAN

*Attesting Officer*

*Commissioner of Patents and Trademarks*